United States Patent [19]
Pabst

[11] Patent Number: 4,573,707
[45] Date of Patent: Mar. 4, 1986

[54] COMPOSITE LIGHTWEIGHT NON-METALLIC VEHICLE FRAME

[76] Inventor: Rudolf D. Pabst, N. 7511 Panorama Dr., Spokane, Wash. 99208

[21] Appl. No.: 575,289

[22] Filed: Jan. 30, 1984

[51] Int. Cl.[4] ............................................. B62D 29/04
[52] U.S. Cl. ..................................... 280/792; 296/31 P
[58] Field of Search ........................ 280/792, 784, 781; 296/31 P

[56] References Cited

U.S. PATENT DOCUMENTS

| | | | |
|---|---|---|---|
| B 223,621 | 1/1975 | Haas | 296/31 P |
| 3,013,922 | 12/1961 | Fisher | 296/31 P |
| 3,481,643 | 12/1969 | Campbell | 296/204 |
| 3,759,540 | 9/1973 | Olsen | 280/784 |
| 3,802,733 | 4/1974 | Appel et al. | 296/189 |
| 4,194,763 | 3/1980 | Beidelbach et al. | 280/784 |
| 4,355,841 | 10/1982 | Ghidella et al. | 296/31 P |
| 4,491,362 | 1/1985 | Kennedy | 296/31 P |

FOREIGN PATENT DOCUMENTS

| | | |
|---|---|---|
| 1914997 | 10/1969 | Fed. Rep. of Germany . |
| 1680609 | 10/1969 | Fed. Rep. of Germany . |
| 2128318 | 12/1972 | Fed. Rep. of Germany . |
| 379379 | 4/1922 | Netherlands . |
| 1314422 | 4/1973 | United Kingdom . |

*Primary Examiner*—Richard A. Bertsch
*Attorney, Agent, or Firm*—Keith S. Bergman

[57] ABSTRACT

A unitary vehicular frame formed of composite plastic material with a medial expanded core and fiber reinforced periphery. The core material is of a lower density and may be formed homogeneously or with various non-homogeneous configurations to provide additional strength. The peripheral material is of a higher density to provide rigidity and strength both by reason of its physical nature, configuration, and spatial position. The core material comprises an in place arbor to aid the formation of the frame. The frame provides the strength, rigidity and durability of a metallic auto frame with less weight and greater insulative value, corrosion resistance and crash protection.

7 Claims, 5 Drawing Figures

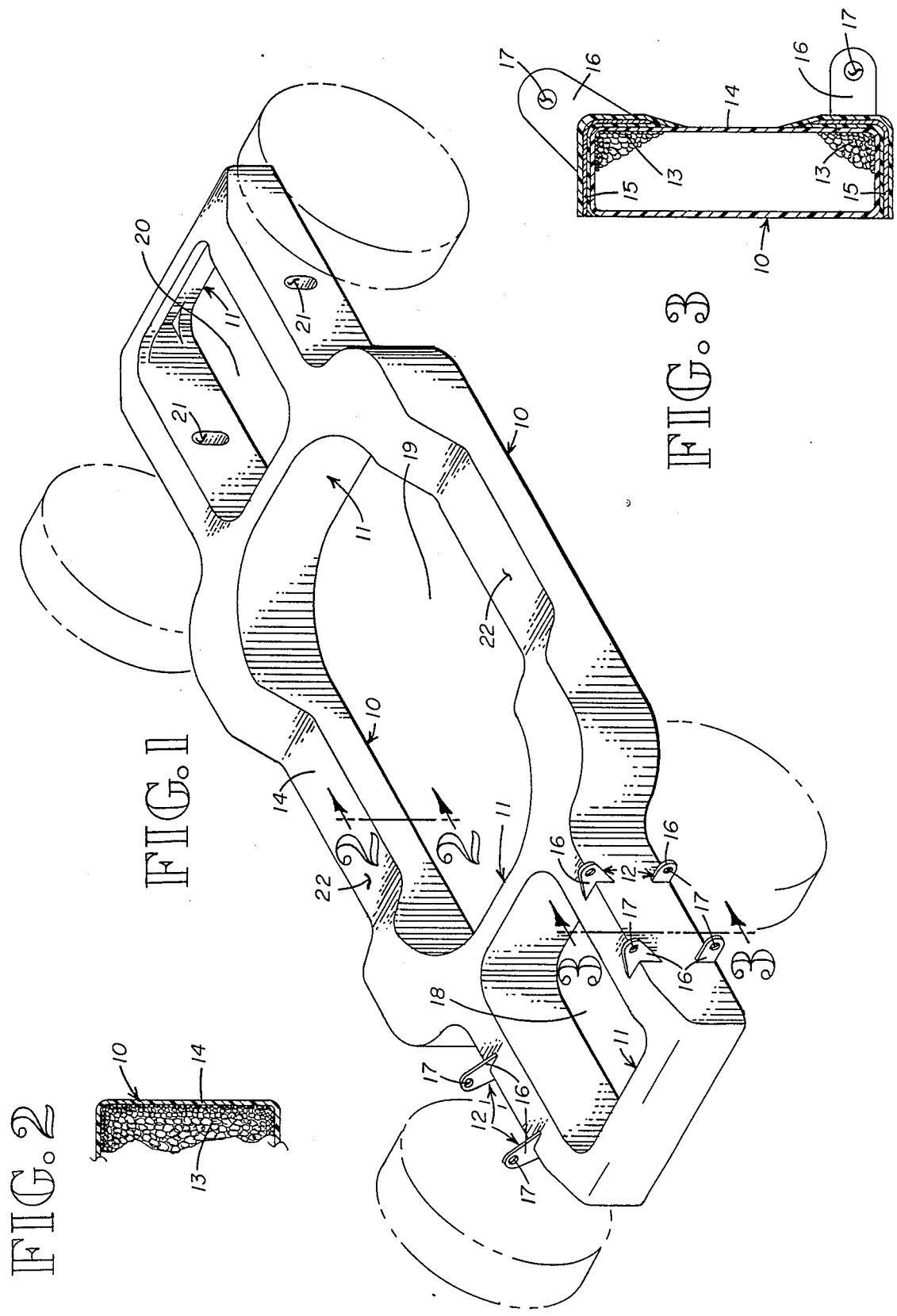

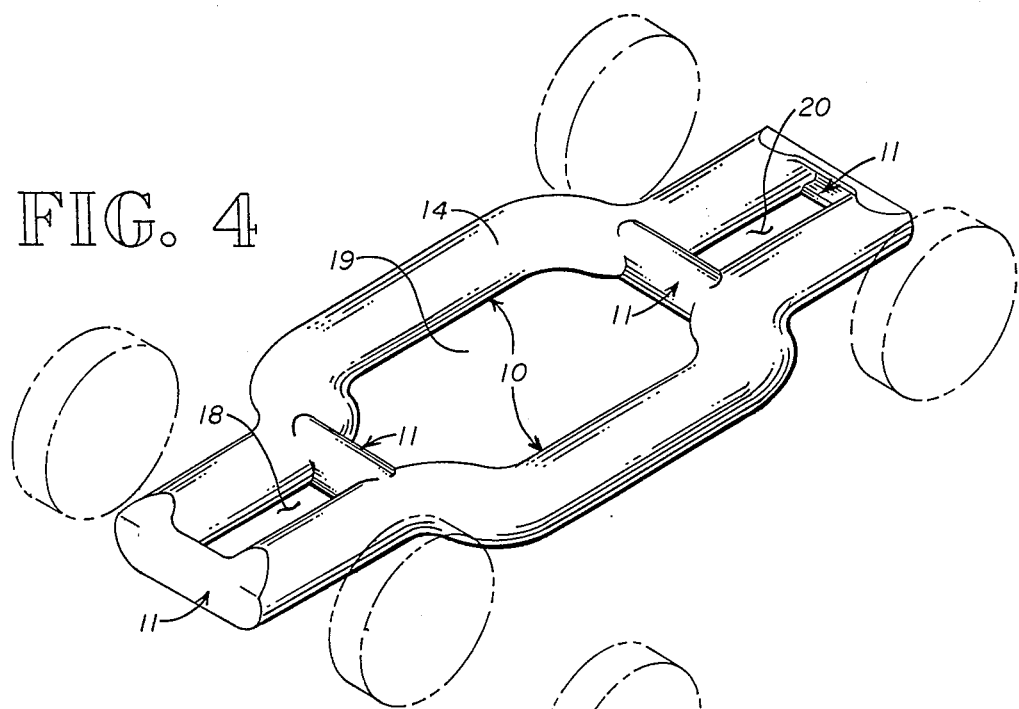
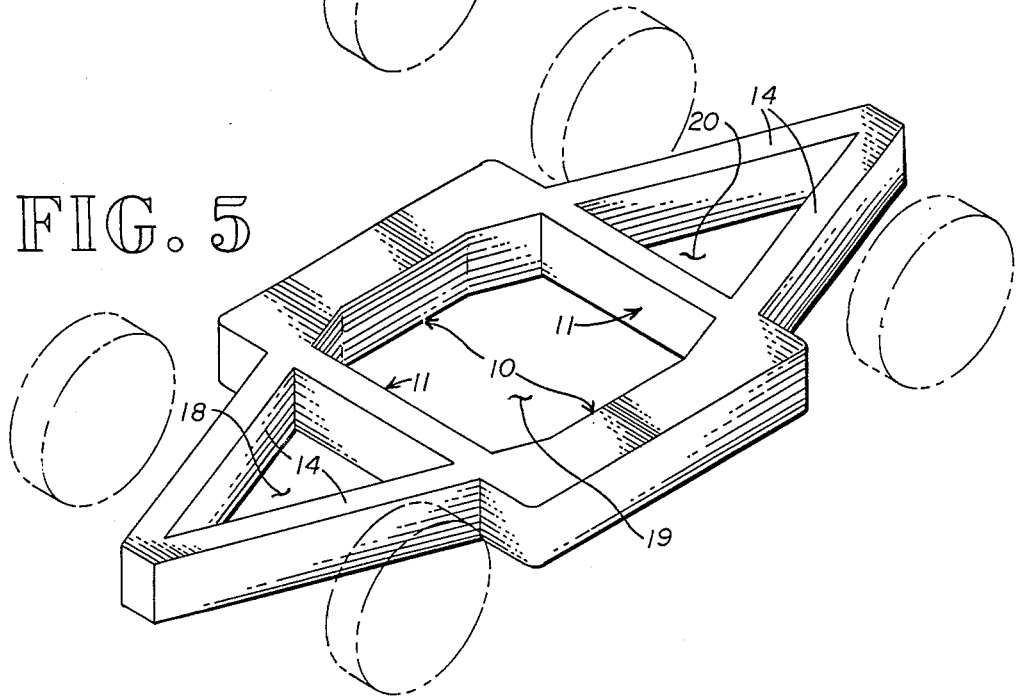

COMPOSITE LIGHTWEIGHT NON-METALLIC VEHICLE FRAME

BACKGROUND OF INVENTION

I. Related Applications

There are no applications related hereto heretofore filed in this or any foreign country.

II. Field of Invention

My invention relates generally to main frames for automotive vehicles and more particularly to such frames as are formed in a unitary fashion from plastic and fiber materials.

III. Description of Prior Art

The frame of an automotive vehicle, often generically called its chassis, serves the purpose of interconnecting the vehicular wheels, providing a structure that is more or less rigid in bending and torsion, and supporting the other components and occupants of a vehicle. In its origin, chassis design was of a beam type with two parallel spaced elongate beams variously interconnected by cross beaming to provide a rigid but heavy structure, similar to the post and beam structural design of its time.

As more concern was directed toward automotive performance it was realized that the chassis mass had to be lessened in performance designed cars, especially such as for racing. Frame construction then evolved to a tubular type originally comprising the so-called ladder construction, essentially similar to the beam type but using hollow elements. Still later the frame evolved to the tubular box type which provided not only a chassis but also a framework for various peripheral body elements of the vehicle. The box frame provides a strong and rigid skeleton for an automotive vehicle but it is relatively complex, difficult of construction and generally must be specially designed for a particular vehicle to accommodate its body and various other components.

Most recently the three dimensional box type frame, sometimes called a unit body, has further evolved to include structural embodiment of various automotive components within the frame itself, particularly parts of the peripheral body and the passenger compartment floor. This type of construction is obviously more specialized than that of the general box frame and because of this it is more difficult of manufacture in the inception and of repair thereafter. Though the overall frame mass is less with the box construction than with the earlier structures from which it evolved, still the frame mass remains in a substantial range and the repair of such a vehicle that has been accidentally damaged is quite costly, complex and time consuming, if at all possible. In general the box frame construction, and particularly that incorporating body elements, provides little crash protection and little insulative capability as to either heat or sound, all to make the design less desirable in an ordinary automotive vehicle.

Design desires for rigidity against bending and torsion in automotive frames have largely been brought about because of the interrelation of these features with suspension systems for the vehicular wheels. In general as the chassis becomes less rigid, the wheel suspension systems must become stiffer. Most automotive vehicles in practical design result in compromise between the stiffness of the chassis and the stiffness of the suspension system to allow proper load carrying capacity, proper steering of the vehicle and reasonable passenger comfort. In general, however, with the traditional types of frame systems described, more emphasis has been placed on frame rigidity than on suspension stiffness and because of this auto frames have remained fairly complex in structure and substantial in mass.

The instant invention seeks to alleviate these problems and incidents associated with them by providing a chassis or underframe essentially of the ladder type but formed of composite plastic and fiber materials. My frame is lighter in weight, from three to six times, than traditional metallic automotive frames. Physically my frame is of a unitary construction that is simple to form and repair, generally without any requirement of highly skilled craftsmanship as is the case with metallic tubular frames. The frame mechanically provides greater strength and rigidity to resist both torsional and bending moments than the traditional metallic frames of either the beam or tubular types that are commonly used in the present day automotive arts. The composite plastic material is quite durable, provides good dynamic vibration absorption and has a greater fatigue resistance than ordinary metallic structures. Impact damage resistance of my frame is greater than that of metallic frames and the overall crash protection is also greater because the frame design provides a progressive crash barrier to absorb severe impact. The frame itself provides substantial insulation to the point of being a barrier to both sound and heat. The material from which the frame is formed is corrosive resistant by nature and is unaffected by normal automotive substances and chemicals. The frame is of substantially lower cost than a comparable metallic frame because of the nature of its materials and their formation.

In design theory, particularly in consideration of the relationship between frame rigidity and suspension stiffness, my frame allows substantially the same relationship as exists in present day vehicle construction. My frame is as rigid as the modern day tubular frame and because of this requires no more stiffness in wheel suspension than do present day tubular frames. In fact, if desired, the wheel suspension may be somewhat less stiff with my frame than with other present day frames to generally allow a more comfortable ride for passengers while maintaining the same driving and cornering characteristics of present day vehicles.

My frame in general provides a larger cross-sectional area but not necessarily a larger peripheral dimension or area than traditional tubular metallic beams. Any peripheral size differential generally provides no disadvantage, however, since my frame merely occupies unused space within the volume enclosed by the traditional vehicle. My beam structure itself though provides several advantages over metallic frames which are only enhanced by any larger peripheral area. In the formation process, if a foamed core be used, the material itself tends to increase in density in proportion to the distance from the center of the element, being most dense at the periphery, which tends to provide greater strength in a position where it is most beneficial. In addition the stronger fiber structure is at the periphery of the frame elements to there perform substantially the same physical function as a hollow or tubular type element. The cross-sectional size of my frame and the material from which it is formed tend to provide substantial shock absorption which is not provided by traditional metallic frames. The rigidity of the whole frame is materially increased because the most rigid portions of the frame are at its periphery and frame strength is increased because the core tends to distribute bending and shear forces over substantial area of the periphery.

In addition the frame elements can define a structure with orifices and a closed periphery to add to the rigidity of the total frame and its shock absorbent powers. The mounting of various automotive components upon my frame is by means of brackets carried by plates structurally embodied within the frame elements. This mounting is quite as simple as the mounting of similar components upon the traditional frames of present day commerce.

My invention in accomplishing these ends is distinguished both structurally and functionally from the vehicular frame structures heretofore known, either individually or in any combination.

SUMMARY OF INVENTION

My invention generally provides a ladder type automotive frame formed of composite fiber and plastic materials.

My frame is a unitary structure which provides similar spaced elongate lateral beams structurally interconnected with cross beams. Each beam is a composite element having a medial lower density core of plastic material with a peripheral higher density skin of fibrous material impregnated with matrix material which adheres to the core. The core element is formed of molded cellular plastic or configured plastic sandwich material. The skin is formed of fibrous material, having substantial tensile strength such as glass or graphite, embedded in a resinous matrix such as polyester or epoxy. The skin is formed directly on the core which serves as an arbor during the formation process. Various bracket structures having plate-like elements for embedding in the skin of the frame are provided to fasten automotive components to the frame.

In creating such a structure it is:

A principal object of my invention to create an automotive frame that is formed of plastic and fiber materials to create a structure that is substantially lighter than traditional metallic frame structures of similar strength.

A further object of my invention is create such a frame that is formed as a unitary structure of the ladder type from composite beam-like elements, each having an internal core covered by a peripheral skin, to provide a frame of substantial strength and rigidity.

A further object of my invention to provide such frame elements that allow the skin portion to be formed directly upon the core element by using it as an arbor in the formation process.

A further object of my invention to provide such a chassis structure that has beam-like elements of substantial cross-sectional area and compressive strength which, when combined with the structural configuration provided, give greater crash protection than with the traditional tubular metallic frames presently used in automotive vehicles.

A further object of my invention to provide such a frame that is of simple construction and repair, making both processes much more cost effective than are the same processes as presently used in connection with tubular metallic auto chassis.

A still further object of my invention to provide such a frame that is of substantial durability and reliability, of high insulative value for both sound and heat and of substantial corrosion resistance, especially from substances commonly associated with automotive vehicles.

A still further object of my invention to provide such an automotive frame that is of new and novel design, of rugged and durable nature, of simple and economic manufacture and one otherwise well suited for the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as is required.

BRIEF DESCRIPTION OF DRAWINGS

In the accompanying drawings which form a part hereof and wherein like numbers of reference refer to similar parts throughout:

FIG. 1 is an isometric view of a frame of my invention showing its elements, their configuration and relationship, with forward suspension plates in place and wheels shown in dashed phantom outline.

FIG. 2 is a somewhat enlarged, cross-sectional view through the lateral frame element of FIG. 1, taken on a plane through line 2—2 thereon, in the direction indicated by the arrows.

FIG. 3 is a partial cross-sectional view through the area of communication of a suspension plate with my frame to show the relationship of the two components, taken on the line 3—3 on FIG. 1, in the direction indicated by the arrows thereon.

FIG. 4 is an isometric view of a ladder type frame having elements formed with a curvilinear cross-sectional shape.

FIG. 5 is a form of my frame, having a medial rectilinear portion with triangular forward and rearward portions.

DESCRIPTION OF PREFERRED EMBODIMENT

My invention provides generally the rigid chassis structure formed of similar spaced longitudinal beams 10 joined by plural cross-beams 11 and carries plural fastening brackets 12 to support various automotive components thereon.

Beam elements 10, 11 are variously configured but all are formed in the same essential fashion, with shaped core 13 covered by relatively thin peripheral skin 14. This type of beam structure is essential to my invention.

Core 13 is formed from rigid plastic material of relatively low density compared to metal and with some extensive strength and relatively high compressive strength. The exact nature of this material may vary somewhat within these limitations. For most beam cores I prefer a foamed plastic material having closed cells such as polyurethane or one of the silicon based foams. Preferably if such material is used it will be formed to shape by foaming in a peripheral mold as when the material be formed in this fashion there normally is a density gradation from lessor density in the medial portion of the element to a higher density at the peripheral surface; and, generally, the size of the cellular voids within the material are similarly distributed, with larger medial and smaller peripheral cells. This type of peripheral surface is not only more dense but also tends to be formed of closed cells to present a relatively smooth external surface for the core not only to provide strength but also to aid bonding of a peripheral skin thereon. The type of material from which a core is formed is not so critical to my invention as are its physical characteristics. Though I prefer a polyurethane or silicon based material, other materials than these may fulfill the purposes of my invention, if not so well.

A core may also be formed by cutting and assembling slabs of pre-foamed plastic material, but if this be done, the peripheral surface of the cores will tend to have open pore structure and no density gradient to make this type of core not so satisfactory as the type foamed in a peripheral mold. Cores may also be formed from other types of plastic materials having appropriate physical characteristics such as honeycomb and sandwich type materials. These materials come in many and various forms, and so long as their density is in the one to twenty-five pound per cubic foot range, many such materials will fulfill the purposes of my invention and some may provide greater strength than foamed plastics. In fact some non-plastic materials of appropriate physical properties, such as balsa wood, could be used as core material for my beams.

Peripheral skin 14 is a relatively thin layer of fiber reinforced plastic. Its density is substantially greater than the core material and it provides a greater proportion of rigidity and tensile strength in my beam structures. The plastic matrix material of the skin preferably is of a type that allows hand formation by layering with woven fiber, so as to allow formation of the frame elements by using the core as an arbor. The skin may also be established by other known formation processes such as molding, dipping and the like, so long as the formation process used is not destructive of the core material or its configuration. I prefer the plastic material of the skin to be a polymer such as polyester or epoxy and its reinforcement to be glass or graphite fibers.

When the skin is formed of epoxy matrix and reinforced with woven fabric of glass fiber, peeling strength of the skin (at ninety degrees) has been found to be approximately seven pounds with a foamed polyurethane core having a surface density of two pounds per cubic foot and one hundred pounds for a similar core having a density of twenty-five pounds per cubic foot. Preferably in my beam structure the foamed core material has a surface density approximating twenty-five pounds per cubic foot.

In situations where optimum strength to weight characteristics are desired for a chassis, I have found that plural layers of reinforcing fibers woven to a cloth should be used and on the vertical sides of a beam, the warp should be at approximately forty-five degrees to the longitudinal axis of the beam, and each layer of cloth should have its warp substantially perpendicular to an adjacent layer. The cloth should overlap the top and bottom of the beam and additional layers of cloth, having warp oriented parallel to the longitudinal axis of the beam, should be added between each cloth layer overlapping the top and bottom of a beam to provide a thicker skin on these principal load carrying surfaces.

A typical test beam having rectilinear cross-sectional shape with a height of ten inches, a width of three inches and an overall weight of 2.4 pounds per linear foot, was formed:

(A) with a core of LAST-A-FOAM number 6700 manufactured by General Plastics Manufacturing Co., of Tacoma, Wash., which is a rigid polyurethane having a density of four pounds per cubic foot, and (B) with peripheral skin of woven glass fiber cloth supplied by Air Craft Spruce and Specialty Company, Fullerton, Calif., and having a density of nine ounces per square yard impregnated with SAFE-T-POXY, an epoxy resin manufactured by Applied Plastics of El Segundo, Calif., and (C) by laminating seven layers of such glass fiber cloth on the vertical sides of the core, with forty-five degree orientation of the cloth warp to the axis of the core, and with twelve additional layers of cloth orientated with warp parallel to the longer axis of the core on both top and bottom with impregnating plastic between all adjacent and on any exposed surfaces.

The beam so formed was then supported in cantilever fashion and loaded at a distance of ninety-three inches from its support to two thousand thirty-two pounds with no structural damage, but the beam was very near its failure point. In general in my beam construction the dimension of the peripheral skin of a plastic beam will have to be approximately 2.56 times the same dimension of a similar steel beam to provide equal strength and rigidity. The weight of such a plastic beam will be approximately forty to sixty percent of the weight of the comparable steel beam, depending upon the exact nature of materials and the formation process used.

If two similar automotive frames of equal structural capacity and a ninety-five inch wheel base be constructed, one of ordinary tubular steel ladder type design and the other of my plastic frame construction, the overall weight of the steel frame will be approximately five hundred twenty pounds while the weight of my frame will be approximately three hundred two pounds. This results in a savings of two hundred eighteen pounds in weight or approximately forty two percent for the fiber reinforced plastic frame. This amount of weight reduction in any vehicular chassis will generally increase the performance characteristics of the vehicle to some degree.

Such an auto frame constructed in the ladder fashion as illustrated in FIG. 1 and as immediately hereinbefore described, in a twenty-five hundred pound gross weight vehicle, will withstand stresses over six times the force of gravity. The normal design standard for high performance vehicles provides a safety factor of three times the force of gravity for work with known forces. The instant structure therefore provides a safety factor one hundred percent over the commonly accepted present day safety standards.

Various vehicular components are structurally attached to my chassis by means of fastening brackets 12. Such fastening brackets are not new per se, but have heretofore become known in the plastic arts and are therefore not dealt with in extended detail herein.

A typical bracket is shown in place in my frame structure in FIG. 1 and in cross-section in FIG. 3 of the drawings. These brackets have configured plate 15, of some areal extent, and in this case bell shaped, to fit within the peripheral skin of the frame structure. Each fastening plate has a protruding fastening lug 16, in this case defining a fastening hole 17 to cooperate in fastening a bolt, pin or similar device. Fastening lug 16 is structurally integral with configured plate 15. An array of such brackets 12 are seen in FIG. 1 as they would be typically used to releasably connect wheel suspension structure to my frame.

It is to be noted that none of the component parts of a vehicle such as floor structure, motor, passenger compartment, seats or other similar elements constitute any part of my frame, but rather are only releasably connected to and supported by it so that they might be readily removed and replaced if necessary. It is to be further noted that the frame is completely self-sufficient without any required assistance from any body structures, whether stressed or otherwise; an automotive body is only supported by my chassis to fit about the various automotive components carried by it.

The general shape of an ordinary automobile frame formed with beams of my invention is shown in FIG. 1 where it is seen to comprise similarly configured, laterally positioned beams 10 interconnected by plural crossbeams 11, in this instance four in number. This general configuration of chassis structure is that heretofore known as the ladder type of structure, though the form illustrated does not much resemble the original structure for which it was named. In general my chassis has the essential configuration illustrated with side elements and cross elements interconnected to form a structure of reasonably closed periphery defining plural internal orifices. Ordinarily this structure will be symmetrical about a medial longitudinal line and in general all chassis structures will have this essential configuration.

A chassis will ordinarily be specifically configured for a particular automotive design. In general each chassis will define some sort of forward motor cavity 18, medial passenger cavity 19 and rearward cavity 20 to carry driving and differential structure if the vehicle have a forwardly mounted motor. Normally axle orifices 21 will be defined in the rearward portion of the frame to communicate through the medial part of the rearward cavity. Oftentimes a medial depression 22 will be defined in the side beams in their medial portion, especially in the case of passenger cars, to accommodate door structures and make ingress and egress therethrough easier.

Since my chassis structure may be somewhat larger in cross-sectional dimension than an ordinary tubular metal frame, it is more important with it to appropriately configure it, other automotive components, or both so that they are compatible. In customary automotive design, however, the inner chassis element is last in the ontology of the design and it is therefore generally configured to accommodate the other automotive components.

In the chassis shown in the accompanying drawings only a few fastening brackets 12 are illustrated in FIG. 1 to show their general relationship to the chassis and their method of attachment to it. Obviously other fastening brackets would be required in a specific application but since they are not an essential part of my invention per se, do not materially effect the structural configuration of my chassis, and are largely a matter of design choice, they are not shown in detail.

A species of chassis having the same essential configuration as that shown in FIG. 1, but formed with beam elements of curvilinear cross section is shown in FIG. 4. This type of a curvilinear beam design is sometimes desirable in work with particular plastics as it provides no sharp corner structures or intersections of components that tend to be difficult to form with composite plastic elements or tend to provide less structural integrity and durability. Oftentimes because of their nature, plastic structures with sharp edges tend to crack, spall and delaminate at those edges and without the sharp edges the probability of such unwanted happenings is lessened.

A specialized type of chassis having a pointed front and rear portion and proportionally somewhat more laterally extended medial body portion is illustrated in FIG. 5. This particular type of chassis is especially effective in withstanding impact. In essence, however, its design is substantially the same as the other chassis illustrated in FIGS. 1 and 4, if we assume that the forwardmost and rearwardmost cross beams are either extremely short or have disappeared entirely.

It is to be noted from the foregoing specification that my invention may be quite conveniently constructed by using the core as an arbor for formation of the peripheral skin. The skin yet may be formed not only by hand lay up methods but by any of the other commonly used methods of forming fiber reinforced plastic membranes such as continuous fiber winding, press molding, and the like.

It is further to be noted, mechanically, that since the core remains in place after formation of the skin, it cooperates with the skin to provide a composite beam having substantially greater strength than a similar hollow beam not having the core in place. The core has substantial compressive strength and even when extensive forces are created upon the peripheral skin portion, those forces will be largely transferred into compressive forces within the beam and especially within the core to substantially resist deformation.

It is further to be noted that the chassis described provide substantial crash protection, firstly, by reason of rigidity and strength of the frame itself and secondly, by its substantial and progressive crush resistance. It should further be noted in this regard that none of the vehicular components constitute a structural part of the chassis but are merely releasably supported upon it, so they might be easily removed for repair or replacement of either component or chassis.

It is further to be noted that my chassis structure provides excellent durability. The structure is a good dynamic vibration absorber and it is highly fatigue resistant in comparison with metal structures because of its intrinsic physical nature and the elimination of small areas of load concentration.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. A composite lightweight non-metallic automotive frame comprising, in combination:
   paired opposed elongate lateral beams interconnected by plural cross beams each of said beams comprising,
   a lower density rigid core covered by a relatively thin higher density peripheral skin formed of matrix material embedding
   reinforcing fibers; and
   means of attaching vehicular components to said frame.

2. The invention of claim 1 further characterized by:
   the core material comprising a plastic foamed in a peripheral mold to create a foam structure having closed cells and a graduated density greatest at the outer surface and decreasing in an inward direction.

3. The invention of claim 1 further characterized by:
   the peripheral skin comprising an epoxy resin matrix material embedding reinforcing fibers constituting plural layers of woven fabric formed of glass fiber.

4. In a non-metallic beam type structural element for an automotive chassis, the combination comprising:
   a rigid lower density foamed plastic core constituting an arbor for formation of a peripheral skin thereabout, and
   a relatively thin higher density peripheral skin, formed of polymeric matrix material impregnating and covering fibrous reinforcing material, adhered to the exposed surface of the core.

5. The invention of claim 4 further characterized by: the core material comprising polyurethane foamed in a peripheral mold, the polymeric matrix material of the peripheral skin comprising epoxy resin, and the fibrous reinforcing material comprising plural layers of woven glass fiber cloth.

6. The invention of claim 4 further characterized by: the fibrous reinforcing material comprising woven cloth fiber with multiple layers of said cloth, orientated with warp at an angle to the longer axis of the beam and at an angle to an adjacent layer of cloth, covering the vertical side portions of the beam, and extending over the top and bottom portions of the beam with additional layers of woven cloth on the top and bottom portions of the beam, said additional layers of cloth orientated with warp parallel to the longer axis of the beam-like element.

7. A non-metallic ladder type automotive frame having beam elements formed of composite plastic materials, comprising in combination:
   paired opposed elongate lateral beams interconnected by plural cross beams, each of said beams and cross beams having,
   a rigid lower density core formed by foaming plastic material in a peripheral mold to create a structure having closed cells and a graduated density that is greatest at the periphery of the core, and
   a higher density peripheral skin formed of polymeric matrix material adhered to the core and embedding reinforcing fiber in the form of woven cloth, plural layers of said cloth, covering the peripheral surfaces of the beams and additional layers of said cloth covering top and bottom portions of the beams, and
   means of releasably fastening automotive components to at least some of the beams.

* * * * *